(12) United States Patent
Fujikawa

(10) Patent No.: US 6,505,414 B2
(45) Date of Patent: Jan. 14, 2003

(54) COMPARATOR

(75) Inventor: Yuji Fujikawa, Higashihiroshima (JP)

(73) Assignee: Mitutoyo Corporation, Kawasaki (JP)

( * ) Notice: Subject to any disclaimer, the term of this patent is extended or adjusted under 35 U.S.C. 154(b) by 9 days.

(21) Appl. No.: 09/879,140

(22) Filed: Jun. 13, 2001

(65) Prior Publication Data

US 2001/0052191 A1 Dec. 20, 2001

(30) Foreign Application Priority Data

Jun. 19, 2000 (JP) ........................................ 2000-182986
Jun. 19, 2000 (JP) ........................................ 2000-182987

(51) Int. Cl.⁷ ................................................ G01B 3/18
(52) U.S. Cl. ............................. 33/813; 33/831; 33/783
(58) Field of Search .......................... 33/813, 814, 815, 33/818, 821, 825, 831, 783, 792, 703, 705, 555.1

(56) References Cited

U.S. PATENT DOCUMENTS 4,174,575 A * 11/1979 Nakata ........................ 33/814
4,485,556 A * 12/1984 Sakata et al. .................. 33/813
4,532,711 A * 8/1985 Shirai ........................... 33/813
5,495,677 A * 3/1996 Tachikake et al. ............. 33/815
5,829,155 A * 11/1998 Takahashi et al. ............. 33/813
6,260,286 B1 * 7/2001 Suzuki et al. .................. 33/831

FOREIGN PATENT DOCUMENTS

JP    Y2 61-17362    5/1986
JP    A 2000-74602   3/2000

* cited by examiner

Primary Examiner—Diego Gutierrez
Assistant Examiner—Yaritza Guadalupe
(74) Attorney, Agent, or Firm—Oliff & Berridge, PLC

(57) ABSTRACT

A comparator (1) has: a frame (2); a spindle and an anvil (4) supported by the frame (2) to be advanceable and retractable in the axial direction thereof; a biaser (39) for biasing the anvil (4) toward the spindle; a release (6) for retracting the anvil relative to the spindle against the biaser (39); an indicator (7); and an indicator driver (8) for transmitting the movement of the anvil (4) to the indicator (7), where a seal member (40, 43, 47) provided on the border between an outer surface of the frame (2) and at least one of the anvil (4), the biaser (39), the release (6) and the indicator (7) and a biasing force adjuster (5) for varying the biasing force of the biaser (39) are provided.

7 Claims, 4 Drawing Sheets

COMPARATOR

BACKGROUND OF THE INVENTION

1. Field of the Invention

The present invention relates to a comparator for measuring dimension difference of a workpiece relative to a standard-size piece, which can be used for measuring dimension difference of a workpiece relative to a master workpiece.

2. Description of Related Art

A comparator has been used for measuring dimension difference of a workpiece relative to a master workpiece.

A conventional comparator has a frame, a spindle and an anvil supported by the frame and moved toward and away with each other by axial movement thereof, a biasing means provided to the frame for biasing the anvil toward the spindle, a release for retracting the anvil relative to the spindle against the biasing means, an indicator provided to the frame and an indicator driver provided to the frame for transmitting the movement of the anvil toward the indicator.

In order to measure dimension difference of a workpiece relative to a master workpiece, the anvil is initially retracted away from the spindle by the release. Then, after interposing a master workpiece between the anvil and the spindle, the release is freed to advance the anvil toward the spindle by the biasing means, so that the master workpiece is held between the anvil and the spindle. At this time, in order to conduct zero adjustment of an index, the spindle is moved in axial direction, or alternatively, a graduation plate of the indicator is rotated. Subsequently, after the anvil is retracted by the release to detach the master workpiece from the comparator, a workpiece is held and measured between the anvil and the spindle in the same operation. Accordingly, the value of the indicator can be measured as dimension difference of the workpiece relative to the master workpiece.

Incidentally, since the above-described comparator holds and measures the workpiece and the master workpiece between the spindle and the anvil, accurate measurement sometimes cannot be conducted according to material of the workpiece. Especially, in measuring a soft, for instance, resin-made workpiece, the workpiece can be deformed on account of the measuring force, thus failing to conduct accurate measurement.

Accordingly, an object of the present invention is to provide a comparator capable of accurate measurement irrespective of material of the workpiece.

Further, the above-described comparator may sometimes be used at a work site where droplet of grinding coolant liquid etc. is directly showered and a workpiece adhered with the coolant liquid is often directly measured. Accordingly, foreign substance such as grinding coolant and water can invade into the indicator driver, thus causing malfunction and deterioration of accuracy.

Another object of the present invention is to provide a comparator capable of preventing invasion of foreign substance and maintaining movement and measurement accuracy.

SUMMARY OF THE INVENTION

The present invention includes following arrangement in order for a comparator to be capable of accurate measurement irrespective of material of a workpiece.

A comparator according to an aspect of the present invention has: a frame; a spindle and an anvil supported by the frame to be advanceable and retractable in the axial direction thereof to move toward and away from each other; a biaser provided to the frame for biasing the anvil toward the spindle; a release for retracting the anvil relative to the spindle against the biaser; an indicator provided on the frame; and an indicator driver provided to the frame for transmitting the movement of the anvil to the indicator, where a seal member interposed at a border between an exterior surface of the frame and at least one of the anvil, the biaser, the release and the indicator.

According to the above aspect of the present invention, though there can be slight gap between the frame and the anvil, the biasing means, the release and the indicator, since the gap is sealed by the seal member, foreign substance such as grinding coolant and water can be prevented from invading into the indicator driver, thus maintaining precise movement and measurement accuracy. Accordingly, durability and reliability of the comparator can be enhanced.

In the above arrangement, the seal member may preferably be cylindrical and expandable, the cylindrical expandable seal member having a first end connected to an outer circumference of the inner end of the anvil and a second end connected to the frame around the outer circumference of the anvil.

Accordingly, since the cylindrical seal member is used, the gap between the anvil and the frame can be completely covered, thus preventing invasion of the foreign substance in the gap. Further, since the seal member is expandable, the seal member expands and contracts in accordance with the axial advancement and retraction of the anvil, thus not impairing the movement of the anvil. Therefore, the invasion of the foreign substance into the frame can be prevented while securing smooth operation of the anvil.

In the above aspect of the present invention, a cap may preferably be screwed to the frame opposing the outer end of the anvil, where the biaser is interposed between the cap and the anvil and wherein a seal member is provided between the frame and the cap.

According to the above arrangement, since the biaser for biasing the anvil toward the spindle is held by the cap screwed to the frame and the gap between the cap and the frame is sealed by the seal member, the invasion of the foreign substance into the frame can be prevented. Further, since the cap is screwed to the frame, the biaser can be easily exchanged by attaching and detaching the cap, so that the biasing force can be adjusted by exchanging the biaser.

In the above aspect of the present invention, the release may preferably project from an inside of the frame toward the outside, the release having a manipulation knob capable of axial advancement and retraction and an interlocking arm provided between the manipulation knob and the anvil for retracting the anvil relative to the spindle interlocking with the manipulation of the manipulation knob, where a first end of a cylindrical expandable seal member may preferably be connected to the frame on the outer circumference of the inner end of the manipulation knob and a second end of a cylindrical expandable seal member may preferably be connected to the outer circumference of the outer end of the manipulation knob.

Accordingly, since the cylindrical seal member is used, the gap between the manipulation knob and the frame can be completely covered, so that invasion of the foreign substance into the gap can be prevented. Further, since the seal member is expandable, the seal member expands and contracts in accordance with axial advancement and retraction of the manipulation knob, thus not impairing the operation of the manipulation knob. Therefore, the invasion of the foreign substance into the frame can be prevented while securing smooth operation of the manipulation knob.

In the above aspect of the present invention, the indicator may preferably include: a case; a graduation plate and an index installed in the case; a transparent plate covering an opening of the case; and an exterior frame for holding the transparent plate to the case, where a seal member is provided between the case and the transparent plate and between the exterior frame and the frame.

Accordingly, though the case, the transparent plate and the exterior frame are independent of the frame, the invasion of the foreign substance into the frame can be prevented by sealing the gap between the case and the transparent plate with the seal member, and the invasion of the foreign substance into the indicator driver can be prevented by sealing the gap between the exterior frame and the frame with the seal member.

In another aspect of the present invention, a comparator capable of preventing invasion of the foreign substance and maintaining operation and measurement accuracy includes following arrangement.

A comparator according to the above aspect of the present invention includes: a frame; a spindle and an anvil supported by the frame to be advanceable and retractable in the axial direction thereof to move toward and away from each other; a biaser provided to the frame for biasing the anvil toward the spindle; a release for retracting the anvil relative to the spindle against the biaser; an indicator provided on the frame; and an indicator driver provided to the frame for transmitting the movement of the anvil to the indicator, the comparator being characterized in that a biasing force adjuster for varying the biasing force of the biaser is provided.

According to the above aspect of the present invention, since the measurement force can be reduced to a range without affecting the shape of the workpiece by the biasing force adjuster, even when the workpiece of soft material, the workpiece is not deformed on account of measuring force, thus enabling accurate measurement and enhancing reliability of the comparator.

In the above aspect of the present invention, the biasing force adjuster may preferably include: a sleeve screwed to the frame opposing an outer end of the anvil; and an adjusting knob screwed to the sleeve, the biaser being interposed between the adjusting knob and the anvil.

Accordingly, the distance from the anvil to the adjusting knob can be changed by rotating the adjusting knob, in other words, the length of the biaser can be changed little by little, the measuring force can be minutely adjusted.

In the above aspect of the present invention, a graduation indicating magnitude of the biasing force may preferably be provided on the outer circumference of the sleeve along the axial direction thereof.

Accordingly, since the graduation is provided on the outer circumference of the sleeve in the axial direction, the distance from the anvil to the adjusting knob can be accurately calculated, so that the measurement force can be adjusted while checking magnitude thereof.

Further, a comparator according to still another aspect of the present invention includes following arrangement in order to conduct accurate measurement without being restricted by the material of the workpiece and prevent the invasion of the foreign substance to prevent operation and measurement accuracy thereof.

A comparator according to the above aspect of the present invention includes: a frame; a spindle and an anvil supported by the frame to be advanceable and retractable in the axial direction thereof to move toward and away from each other; a biaser provided to the frame for biasing the anvil toward the spindle; a release for retracting the anvil relative to the spindle against the biaser; an indicator provided on the frame; and an indicator driver provided to the frame for transmitting the movement of the anvil to the indicator, the comparator being characterized in that a seal member and a biasing force adjuster for varying the biasing force of the biaser are provided on the border between an outer surface of the frame and at least one of the anvil, the biaser, the release and the indicator.

According to the above aspect of the present invention, though there can be slight gap between the frame and the anvil, the biaser, the release and the indicator, the gap is sealed by the seal member, the foreign substance such as the grinding coolant and water at work site can be prevented from invading into the indicator driver, thus maintaining operation and measurement accuracy. Accordingly, durability and reliability of the comparator can be improved.

In addition, since the measuring force can be decreased to a range without influencing on the shape of the workpiece by the biasing force adjustor, the workpiece is not deformed on account of the measuring force, so that accurate measurement is possible and reliability of the comparator can be enhanced.

DETAILED DESCRIPTION OF PREFERRED EMBODIMENT(S)

An embodiment of the present invention will be described below with reference to attached drawings.

Figure 1:
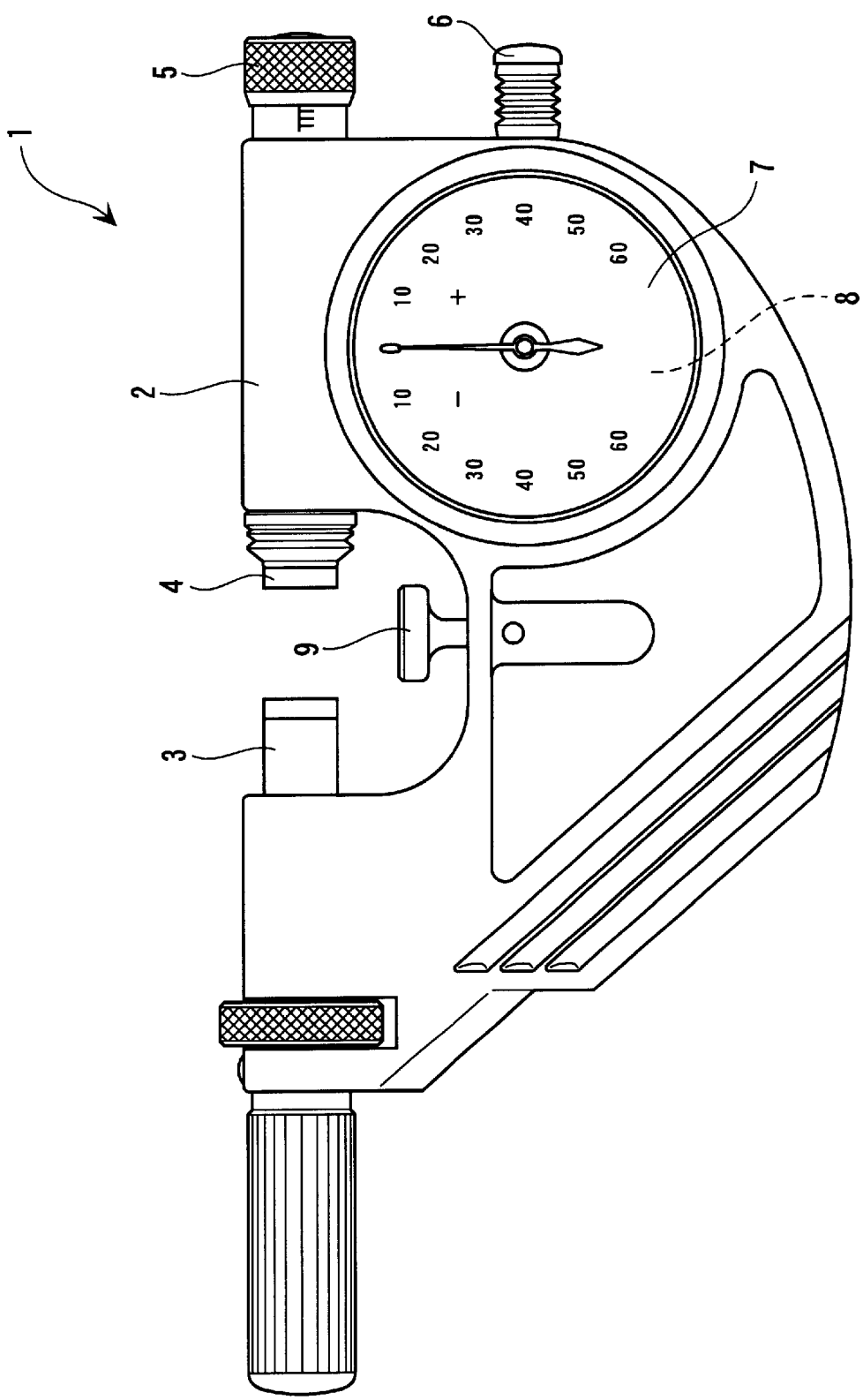
FIG. 1 is an entire view showing an embodiment of the present invention.

FIG. 1 shows a comparator 1 of the present embodiment. The comparator 1 has a U-shaped frame 2, a spindle 3 supported on an end of the frame 2 and movable in axial direction thereof, an anvil 4 supported on the other end of the frame 2, the anvil 4 being advanceable and retractable in the axial direction thereof to move toward and away from the spindle 3, a biasing force adjuster 5 provided to the frame 2 for biasing the anvil 4 toward the spindle 3 with a variable biasing force, a release 6 for retracting the anvil 4 away from the spindle 3 against the biasing force of the biasing force adjuster 5, an indicator 7 provided substantially at the center of the frame 2 adjacent to the anvil 4, an indicator driver 8 provided to the frame 2 for transmitting the movement of the anvil 4 to the indicator 7, and a support base 9 provided to the frame 2 for supporting a workpiece.

Figure 2:
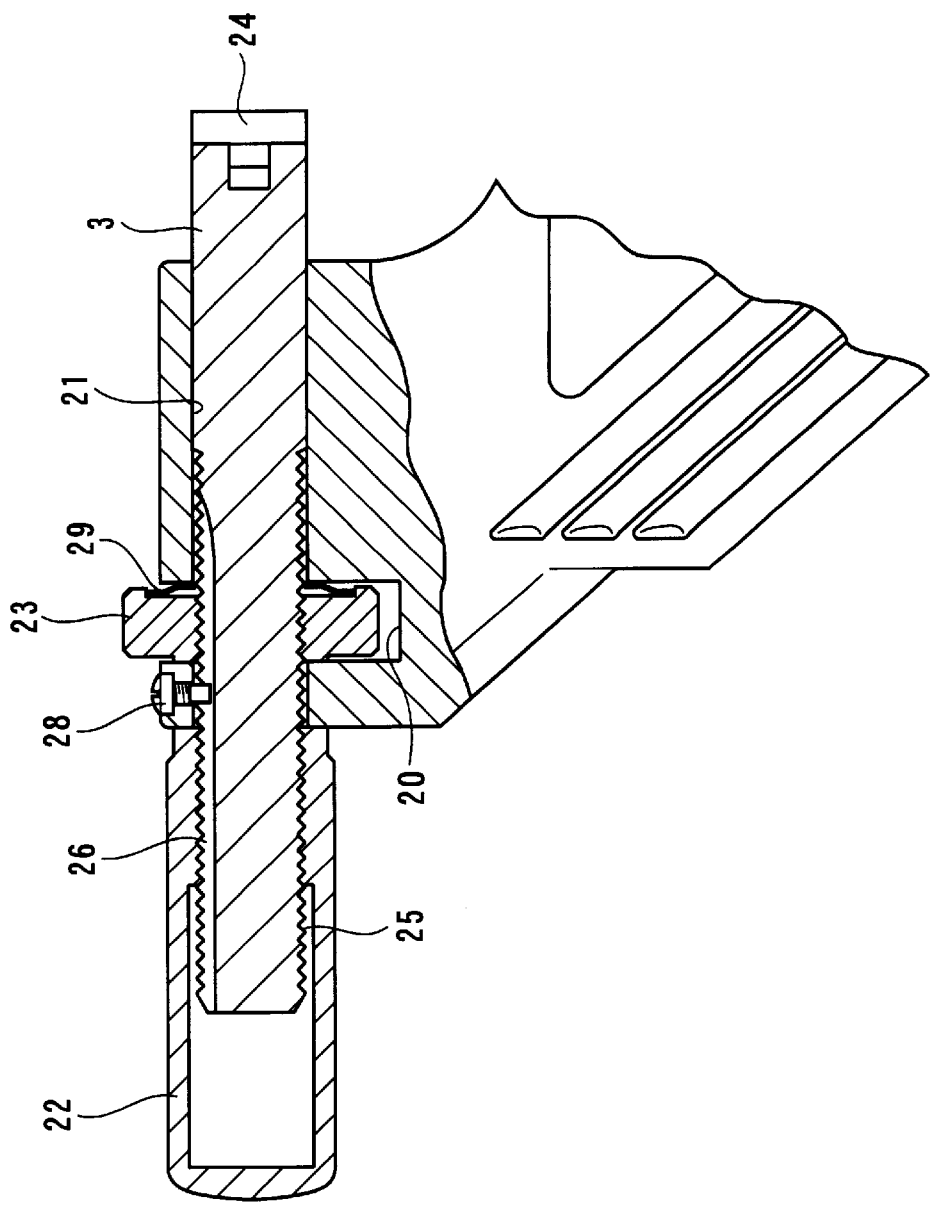
FIG. 2 is an enlarged cross section of a portion adjacent to a support of a spindle of the aforesaid embodiment.

FIG. 2 shows an enlarged cross section around the supporting portion of the spindle 3.

An insert hole 21 coaxial with the axial direction of the anvil 4 is provided to an end of the frame 2 and a recess 20 orthogonal with the insert hole 21 is provided on the way of the insert hole 21. The spindle 3 is inserted to the insert hole 21 tp be advamceable and retractable in the axial direction thereof. A spindle moving ring 23 for advancing and retracting the spindle 3 is rotatably provided to the recess 20.

The spindle 3 has a rigid contact piece 24 at an inner end (an end on the side of the anvil 4) thereof. An external thread 25 is carved on the outer circumference of the spindle 3 from approximate center to the external end thereof, the external thread 25 having a key groove 26 formed along the axial direction of the spindle 3. A distal end of a bolt 28 screwed to the frame 2 engages to the key groove 26. The spindle moving ring 23 disposed in the recess 20 is screwed on the middle portion of the external thread 25 and a clamp cap 22 is screwed on the outer end portion of the external thread 25.

The spindle moving ring 23 is rotatable in the recess 20 so that the axial movement of the spindle 3 is restricted. Accordingly, since the rotation of the spindle 3 is restricted by the bolt 28 and the key groove 26, the spindle advances and retracts in the axial direction thereof by rotating the spindle moving ring 23. A plate spring 29 is interposed between an end surface of the spindle moving ring 23 and the recess 20, the plate spring 29 pressing the spindle moving ring 23 toward the wall surface of the recess 20 causing resistance against rotation of the spindle moving ring 23, thus preventing unintended movement thereof.

The clamp cap 22 is a cylinder having axial dimension longer than longitudinal dimension thereof, which is capable of adjusting advancement and retraction of the spindle 3 and is screwed to the external end side of the spindle 3. Accordingly, the spindle 3 is clamped to the frame 2 by rotating the clamp cap 22 to bring the inner end thereof into contact with the frame 2 irrespective of the position of the spindle 3.

Figure 3:
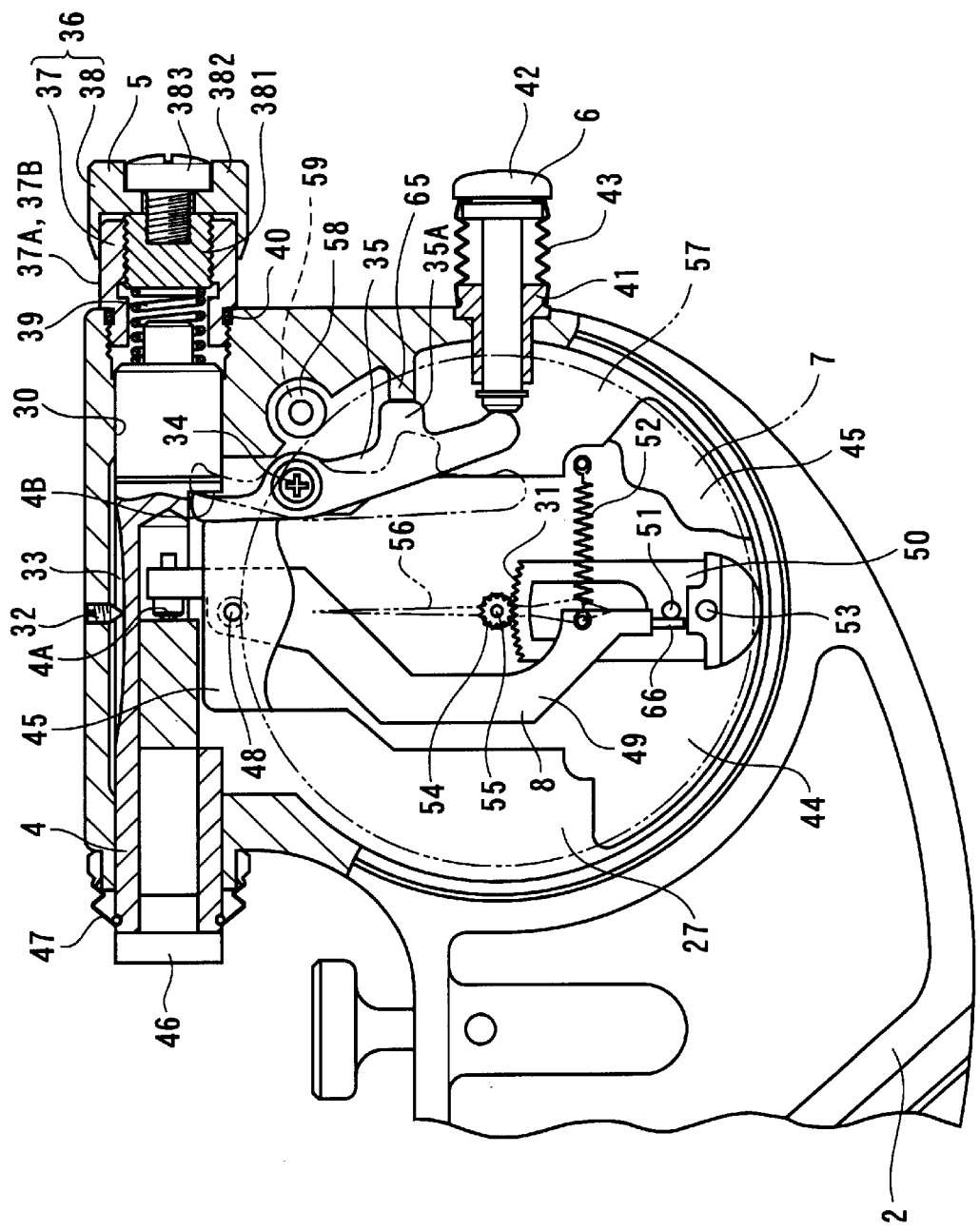
FIG. 3 is an enlarged cross section showing a support of an anvil, a biasing force adjuster, a release and an indicator driver of the aforesaid embodiment.

FIG. 3 shows an enlarged cross section of the supporting portion of the anvil 4, the biasing force adjuster 5, the release 6 and the indicator driver 8.

An insert hole 30 is formed coaxially with the axial direction of the spindle 3 on the other end of the frame 2 (an end remote from the spindle 3), where the anvil 4 is accommodated in the insert hole 30 advanceably and retractably in the axial direction thereof.

The anvil 4 has a rigid contact piece 46 at an inner end (an end on the spindle 3 side) thereof. Abutting surfaces 4A and 4B orthogonal with the axial direction of the anvil 4 are cut at an approximate center thereof. A key groove 33 is formed along the axial direction of the anvil 4. The abutting surface 4A is formed opposite to the inner end surface of the anvil 4 and the abutting surface 4B opposes to the abutting surface 4A. A distal end of the bolt 32 screwed to the frame 2 engages with the key groove 33, thus restricting the rotation of the anvil 4.

An expandable cylindrical seal member 47 having bellow cross section is provided to a border on the inner end of the anvil 4 projecting from the frame. An end of the seal member 47 is connected to an outer circumference of the anvil 4 adjacent to the contact piece 46 and the other end thereof is connected to the frame 2 on the outside of the anvil 4.

The biasing force adjuster 5 is composed of a compression spring 39 as a biasing means accommodated in the external end of the anvil 4 in the insert hole 21 and a biasing force adjusting mechanism 36 as a cap screwed on the outer end of the insert hole 21 capable of adjusting biasing force of the compression spring 39.

The biasing force adjusting mechanism 36 has a sleeve 37 screwed to the outer end side of the insert hole 30 of the frame 2, and an adjusting knob 38 screwed to the outer end of the sleeve 37. A base line 37A extending along the axial direction and a scale 37B orthogonal with the base line 37A indicating strength of the biasing force are provided to the outer circumference of the sleeve 37. The adjusting knob 38 has a pressing portion 381 screwed to the sleeve 37 for pressing the compression spring 39 and a thimble 382 secured to the pressing portion 381 through a set-screw 383 and fitted to the outside of the sleeve 37.

A ring-shaped seal member 40 is provided between the sleeve 37 and the insert hole 30 to seal the gap between the sleeve 37 and the insert hole 30.

The release 6 has a manipulation knob 42 projecting from the inside of the frame 2 toward the outside thereof and advanceable and retractable in the axial direction thereof, and an interlocking arm 35 provided between the manipulation knob 42 and the anvil 4 to retract the anvil 4 away from the spindle 3 interlocking with the operation of the manipulation knob 42.

The manipulation knob 42 is supported to the frame 2 through an insert cylinder 41. A cylindrical expandable seal member 43 having bellow cross section is provided between the insert cylinder 41 and the manipulation knob 42. An end of the seal member 43 is connected to the insert cylinder 41 and the other end thereof is connected to the outer circumference of the outer end of the manipulation knob 42.

The interlocking arm 35 is rotatably supported via a central shaft 34. An end of the interlocking arm 35 abuts the abutting surface 4B and the other end thereof abuts to the inner end of the manipulation knob 42. A projection 35A is provided between the other end of the interlocking arm and the central shaft 34, the projection 35A abutting a stopper 65 provided to the frame 2. Accordingly, the movement of the anvil 4 is stopped to restrict further movement of the anvil 4 toward the inner end.

The indicator driver 8 has a bottom base plate 44 secured to a recess 27 formed inside the frame 2, a top base plate 45 secured with a predetermined space retained by a spacer (not shown), an interlocking member 49 provided between the base plates 44 and 45 pivotably moving in accordance with movement of the anvil 4, a seesaw member 50 pivotably moved in accordance with pivotal movement of the interlocking member 49 and a pinion 54 rotating interlocking with the seesaw member 50.

The interlocking member 49 is rotatably supported by a pin 48 provided adjacent to an end thereof, an end thereof abutting to the abutting surface 4A and the other end being provided with a pin 66. A spring 52 constantly biases neighborhood of the other end of the interlocking member 49 toward the outer end of the anvil 4 in the axial direction, i.e. counterclockwise in FIG. 3. Accordingly, an end of the interlocking member 49 constantly abuts to the abutting surface 4A.

The seesaw member 50 is rotatably supported by a central shaft 53. A sector gear 31 meshing with the pinion 54 is provided along a common circumference around the central shaft 53 and a pin 51 in contact with the pin 66 is provided between the sector gear 31 and the central shaft 53.

The pinion 54 is rotatably supported by the base plates 44 and 45 through a central shaft 55, an end of the pinion 54 penetrating and projecting through the top base plate 45.

Figure 4:
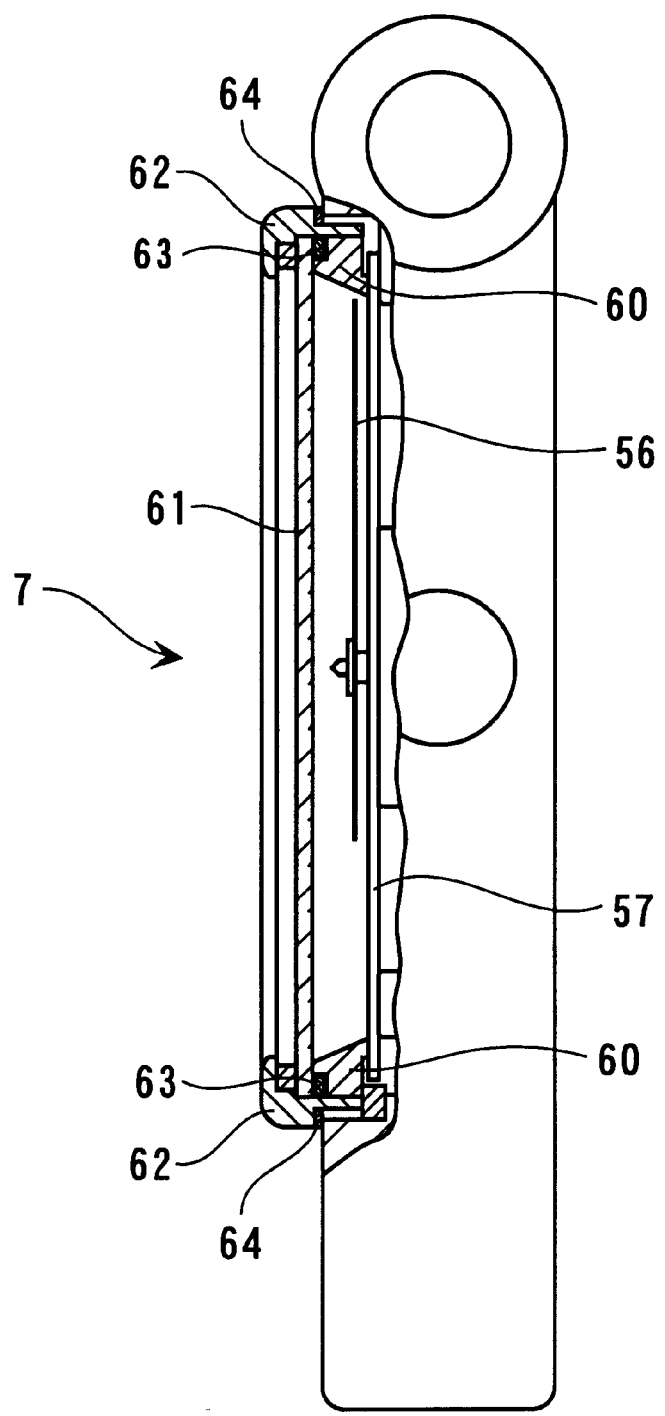
FIG. 4 is an enlarged cross section of an indicator portion of the aforesaid embodiment.

FIG. 4 shows a cross section of the indicator 7.

The indicator 7 has a case 60, a graduation plate 57 and an index 56 installed in the case 60, a transparent plate 61 covering the opening of the case 60 and an exterior frame 62 for holding the transparent plate 61 to the case 60.

A ring-shaped seal member 63 is interposed between the case 60 and the transparent plate 61 to seal the gap between the case and the transparent plate 61. Another ring-shaped seal member 64 is interposed between the exterior frame 62 and the frame 2 to seal the gap between the exterior frame 62 and the frame 2.

The graduation plate 57 is a disk illustrated in double-dotted line shown in FIG. 3, which is provided on the top base plate 45 and is rotatably held around the central shaft 55. Cogs (not shown) are formed on the outer circumference of the graduation plate 57 to which a pinion 58 is meshed.

The pinion 58 is supported to be integrally rotated with a manipulation knob 59 protruding from the backside of the frame 2 toward the outside, the manipulation knob 59 being capable of manipulating from the outside.

The index 56 is secured to the central shaft 55 penetrating the top base plate 45 and the graduation plate 57 so as to be integrated and rotated with the pinion 54.

Next, a function of the present embodiment will be described below.

Initially, a master workpiece consistent with a processing dimension of a workpiece is prepared. While the clamp cap 22 is loosened in accordance with the shape of the master workpiece, the spindle moving ring 23 is rotated to set the position of the spindle 3 in accordance with the dimension of the master workpiece and the clamp cap 22 is fastened to fix. While checking the magnitude of the measuring force by the base line 37A and the graduation 37B, the adjusting knob 38 is rotated to slightly change the length of the compression spring 39 for minute adjustment of the measuring force in accordance with the material of the workpiece.

When the manipulation knob 42 is pushed under the above condition, as shown in double-dotted line in FIG. 3, the interlocking arm 35 rotates clockwise to retract the anvil 4 to the outer end side (opposite to the spindle 3) against the compression spring 39. Then, the master workpiece is inserted between the spindle 3 and the anvil 4 to be supported by the support base 9, thus releasing the push of the manipulation knob 42.

In accordance with the release of the manipulation knob 42, the anvil 4 advances by the function of the compression spring 39, so that the master workpiece is held between the anvil 4 and the spindle 3. The movement of the anvil 4 is transmitted to the index 56 through the interlocking member 49 in contact with the abutting surface 4A, the pin 66, the pin 51, the seesaw member 50, the sector gear 31, the pinion 54 and the central shaft 55.

While holding the master workpiece, the index 56 is arranged to be directed in a direction illustrated in double-dotted line in FIG. 3. However, since the direction of the index 56 does not always indicate zero-graduation of the graduation plate 57, the adjusting knob 59 is rotated to adjust the index 56 so that the index 56 precisely indicates zero.

Subsequently, the manipulation knob 42 is pushed in to release and take out the master workpiece held between the spindle 3 and the anvil 4. After a workpiece is inserted instead of the master workpiece, the push-in of the manipulation knob 42 is released to hold the workpiece between the spindle 3 and the anvil 4. The displacement of the anvil 4 can be read out as a deviation of the index 56 from the zero-graduation, thereby obtaining dimension of the workpiece.

According to the above-described embodiment, following advantage can be obtained.

(1) There can be slight gap between the frame 2 and the anvil 4, the biasing means 5, the release 6 and the indicator 7. However, since the gap is sealed by the seal member, foreign substance such as grinding coolant and water can be prevented from invading into the indicator driver 8, thus maintaining precise movement and measurement accuracy. Accordingly, durability and reliability of the comparator can be enhanced.

(2) Since the gap between the anvil 4 and the frame 2 is covered with the cylindrical seal member 47, the foreign substance can be prevented from invading into the gap. Further, since the seal member 47 is expandable, the seal member 47 expands and contracts in accordance with axial advancement and retraction of the anvil and does not impede the movement of the anvil 4. Accordingly, the foreign substance can be prevented from invading into the frame without impairing workability.

(3) Since the compression spring 39 for biasing the anvil 4 toward the spindle 3 is held by the biasing force adjuster 36 screwed to the frame 2 and the gap between the biasing force adjuster 36 and the frame 2 is sealed by the seal member 40, the invasion of the foreign substance into the frame 2 can be prevented. Further, since the biasing force adjusting mechanism 36 is screwed to the frame 2, the compression spring 39 can be easily exchanged, thus freely adjusting the biasing force by exchanging the compression spring 39.

(4) Since the distance from the inner end of the pressing portion 381 to the outer end of the anvil 4 changes by rotating the adjusting knob 38, in other words, since the length of the compression spring 39 can be changed little by little, minute adjustment of the measuring force is possible. Accordingly, even when the workpiece is of soft material, the workpiece does not deforms by adjusting the measuring force, so that accurate measurement can be conducted. Further, since the base line 37A and the graduation 37B are provided on the outer circumference of the sleeve 37, the measuring force can be set while checking magnitude thereof.

(5) Since the gap between the manipulation knob 42 and the insert cylinder 41 is covered with cylindrical seal member 43, the foreign substance does not invade into the gap. Further, since the seal member 43 is expandable, the seal member 43 stretches and contracts in accordance with axial advancement and retraction of the manipulation knob 42 and does not impede the movement of the manipulation knob 42. Accordingly, the foreign substance can be prevented from invading into the frame 2 without impairing workability.

(6) Since the gap between the exterior frame 62 and the frame 2 is sealed by the seal member 64, the foreign substance can be prevented from invading into the indicator driver 8. Further, since the gap between the case 60 and the transparent plate 61 constituting the indicator 7 is sealed by the seal member 63, the foreign substance can be prevented from invading into the indicator 7.

Incidentally, the scope of the present invention is not restricted to the above-described embodiment, but includes modification and improvement as long as an object of the present invention can be achieved.

For instance, though an analog indicator 7 and the indicator driver 8 are used in the above-described embodiment, a digital indicator and an indicator driver may be used for the same effect.

Though the seal member 43 and 47 are of bellow cross section in the above-described embodiment, other configuration is possible as long as the motion of the anvil 4 and the manipulation knob 42 can be secured.

Though the graduation plate 57 is a flat gear meshing with the pinion 58, a, for instance, rubber roller may be abutted without providing the graduation plate 57 with cogs.

What is claimed is:

1. A comparator, comprising:

a frame;

a spindle and an anvil supported by the frame to be advanceable and retractable in the axial direction thereof to move toward and away from each other;

a biaser provided to the frame for biasing the anvil toward the spindle;

a release for retracting the anvil relative to the spindle against the biaser;

an indicator provided on the frame; and an indicator driver provided to the frame for transmitting the movement of the anvil to the indicator, wherein a seal member is interposed at a border between an exterior surface of the frame and at least one of the anvil, the biaser, the release and the indicator; and further wherein a cap is screwed to the frame opposing the outer end of the anvil, wherein the biaser is interposed between the cap and the anvil and wherein a seal member is provided between the frame and the cap.

2. A comparator, comprising:

a frame;

a spindle and an anvil supported by the frame to be advanceable and retractable in the axial direction thereof to move toward and away from each other;

a biaser provided to the frame for biasing the anvil toward the spindle;

a release for retracting the anvil relative to the spindle against the biaser;

an indicator provided on the frame; and an indicator driver provided to the frame for transmitting the movement of the anvil to the indicator, wherein a seal member is interposed at a border between an exterior surface of the frame and at least one of the anvil, the biaser, the release and the indicator; and further wherein the release projects from an inside of the frame toward the outside, the release having a manipulation knob capable of axial advancement and retraction and an interlocking arm provided between the manipulation knob and the anvil for retracting the anvil relative to the spindle interlocking with the manipulation of the manipulation knob, and wherein a first end of a cylindrical expandable seal member is connected to the frame on the outer circumference of the inner end of the manipulation knob and a second end of a cylindrical expandable seal member is connected to the outer circumference of the outer end of the manipulation knob.

3. A comparator, comprising:

a frame;

a spindle and an anvil supported by the frame to be advanceable and retractable in the axial direction thereof to move toward and away from each other;

a biaser provided to the frame for biasing the anvil toward the spindle;

a release for retracting the anvil relative to the spindle against the biaser;

an indicator provided on the frame; and an indicator driver provided to the frame for transmitting the movement of the anvil to the indicator, wherein a seal member is interposed at a border between an exterior surface of the frame and at least one of the anvil, the biaser, the release and the indicator; and the indicator further comprising:

a case;

a graduation plate and an index installed in the case;

a transparent plate covering an opening of the case; and an exterior frame for holding the transparent plate to the case, wherein a seal member is provided between the case and the transparent plate and between the exterior frame and the frame.

4. A comparator comprising:

a frame;

a spindle and an anvil supported by the frame to be advanceable and retractable in the axial direction thereof to move toward and away from each other;

a biaser provided to the frame for biasing the anvil toward the spindle;

a release for retracting the anvil relative to the spindle against the biaser;

an indicator provided on the frame;

an indicator driver provided to the frame for transmitting the movement of the anvil to the indicator; and a biasing force adjuster for varying the biasing force of the biaser.

5. The comparator according to claim 4, the biasing force adjuster comprising: a sleeve screwed to the frame opposing an outer end of the anvil; and an adjusting knob screwed to the sleeve, the biaser being interposed between the adjusting knob and the anvil.

6. The comparator according to claim 5, wherein a graduation indicating magnitude of the biasing force is provided on the outer circumference of the sleeve along the axial direction thereof.

7. A comparator comprising:

a frame;

a spindle and an anvil supported by the frame to be advanceable and retractable in the axial direction thereof to move toward and away from each other;

a biaser provided to the frame for biasing the anvil toward the spindle;

a release for retracting the anvil relative to the spindle against the biaser;

an indicator provided on the frame; and an indicator driver provided to the frame for transmitting the movement of the anvil to the indicator;

wherein a seal member and a biasing force adjuster for varying the biasing force of the biaser are provided on the border between an outer surface of the frame and at least one of the anvil, the biaser, the release and the indicator.

* * * * *